US008155452B2

(12) United States Patent
Minear

(10) Patent No.: US 8,155,452 B2
(45) Date of Patent: Apr. 10, 2012

(54) IMAGE REGISTRATION USING ROTATION TOLERANT CORRELATION METHOD

(75) Inventor: Kathleen Minear, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 854 days.

(21) Appl. No.: 12/247,603

(22) Filed: Oct. 8, 2008

(65) Prior Publication Data

US 2010/0086220 A1 Apr. 8, 2010

(51) Int. Cl.
*G06K 9/68* (2006.01)
(52) U.S. Cl. .................... 382/218; 382/181; 382/209
(58) Field of Classification Search .................. 382/181, 382/218, 231, 276, 308, 173, 175, 162, 167, 382/100
See application file for complete search history.

(56) References Cited

U.S. PATENT DOCUMENTS

| | | |
|---|---|---|
| 5,247,587 A | 9/1993 | Hasegawa et al. |
| 5,416,848 A | 5/1995 | Young |
| 5,781,146 A | 7/1998 | Frederick |
| 5,875,108 A | 2/1999 | Hoffberg et al. |
| 5,901,246 A | 5/1999 | Hoffberg et al. |
| 5,988,862 A | 11/1999 | Kacyra et al. |
| 6,081,750 A | 6/2000 | Hoffberg et al. |
| 6,206,691 B1 | 3/2001 | Lehmann et al. |
| 6,246,468 B1 | 6/2001 | Dimsdale |
| 6,271,860 B1 | 8/2001 | Gross |
| 6,330,523 B1 | 12/2001 | Kacyra et al. |
| 6,400,996 B1 | 6/2002 | Hoffberg et al. |
| 6,405,132 B1 | 6/2002 | Breed et al. |
| 6,418,424 B1 | 7/2002 | Hoffberg et al. |
| 6,420,698 B1 | 7/2002 | Dimsdale |
| 6,473,079 B1 | 10/2002 | Kacyra et al. |
| 6,476,803 B1 | 11/2002 | Zhang et al. |
| 6,512,518 B2 | 1/2003 | Dimsdale |
| 6,512,993 B2 | 1/2003 | Kacyra et al. |
| 6,526,352 B1 | 2/2003 | Breed et al. |
| 6,904,163 B1 | 6/2005 | Fujimura et al. |

(Continued)

FOREIGN PATENT DOCUMENTS

DE 197 46 639 5/1999

(Continued)

OTHER PUBLICATIONS

Wijk et al. "Enridged Contour Maps", 2001, VIS'01 Proceedings of the conference on Visualization '01, IEEE Computer Society Washington DC USA, p. 69-74.

(Continued)

*Primary Examiner* — Brian Q Le
*Assistant Examiner* — Edward Park
(74) *Attorney, Agent, or Firm* — Fox Rothschild, LLP; Robert J. Sacco

(57) ABSTRACT

A method for correlating or finding similarity between two data sets. The method can be used for correlating two images with common scene content in order to find correspondence points between the data sets. These correspondence points then can be used to find the transformation parameters which when applied to image 2 brings it into alignment with image 1. The correlation metric has been found to be invariant under image rotation and when applied to corresponding areas of a reference and target image, creates a correlation surface superior to phase and norm cross correlation with respect to the correlation peak to correlation surface ratio. The correlation metric was also found to be superior when correlating data from different sensor types such as from SAR and EO sensors. This correlation method can also be applied to data sets other than image data including signal data.

21 Claims, 8 Drawing Sheets

U.S. PATENT DOCUMENTS

| | | | |
|---|---|---|---|
| 7,015,931 B1 | 3/2006 | Cieplinski |
| 7,046,841 B1 | 5/2006 | Dow et al. |
| 7,098,809 B2 | 8/2006 | Feyereisen et al. |
| 7,130,490 B2 | 10/2006 | Elder et al. |
| 7,206,462 B1 | 4/2007 | Betke |
| 7,242,460 B2 | 7/2007 | Hsu et al. |
| 7,477,360 B2 | 1/2009 | England |
| 7,647,087 B2 | 1/2010 | Miga et al. |
| 7,777,761 B2 | 8/2010 | England |
| 7,831,087 B2 | 11/2010 | Harville |
| 7,940,279 B2 | 5/2011 | Pack |
| 7,974,461 B2 | 7/2011 | England |
| 7,990,397 B2 | 8/2011 | Bukowski |
| 8,045,762 B2 | 10/2011 | Otani |
| 2002/0059042 A1 | 5/2002 | Kacyra et al. |
| 2002/0145607 A1 | 10/2002 | Dimsdale |
| 2002/0149585 A1 | 10/2002 | Kacyra et al. |
| 2002/0158870 A1 | 10/2002 | Brunkhart et al. |
| 2002/0176619 A1 | 11/2002 | Love |
| 2003/0001835 A1 | 1/2003 | Dimsdale et al. |
| 2004/0109608 A1 | 6/2004 | Love et al. |
| 2004/0114800 A1 | 6/2004 | Ponomarev et al. |
| 2005/0171456 A1 | 8/2005 | Hirschman et al. |
| 2005/0243323 A1 | 11/2005 | Hsu et al. |
| 2006/0061566 A1 | 3/2006 | Verma et al. |
| 2006/0244746 A1 | 11/2006 | England et al. |
| 2007/0081718 A1 | 4/2007 | Rubbert et al. |
| 2007/0280528 A1 | 12/2007 | Wellington et al. |
| 2009/0225073 A1 | 9/2009 | Baker, III |
| 2009/0231327 A1 | 9/2009 | Minear et al. |
| 2009/0232355 A1 | 9/2009 | Minear et al. |
| 2009/0232388 A1 | 9/2009 | Minear et al. |
| 2010/0118053 A1 | 5/2010 | Karp et al. |
| 2010/0209013 A1 | 8/2010 | Minear et al. |

FOREIGN PATENT DOCUMENTS

| | | |
|---|---|---|
| EP | 1 492 054 | 12/2004 |
| EP | 1 505 547 | 2/2005 |
| JP | 05-205072 A | 8/1993 |

OTHER PUBLICATIONS

Hengl, T. "Visualisation of uncertainty using the HSI colour model: Computations with colours." Sep. 2003, Proceedings of the 7th International Conference on GeoComputation, Southampton, United Kingdom, pp. CDROM, pp. 8-17.

Hyun "Nonlinear Color Scales for Interactive Exploration", 1991, (http://web.archive.org/web/20050921025757/http://www.caida.orghyough/colorscales/nonlinear.html).

Bourke "Colour Ramping for Data Visualisation", Jul. 1996 (http://web.archive.org/web/20060914040403/http://local.wasp.uwa.edu.auhpbourke/colour/colourramp).

Levkowitz et al. "Color Scales for Image Data", Jan. 1992, IEEE Computer Graphics & Applications, p. 72-80.

Chen, et al., "Fusion of Lidar Data and Optical Imagery for Building Modeling".

Cyr, et al., "2D-3D Registration Based on Shape Matching", Mathematical Methods in Biomedical Image Analysis, 2000 IEEE.

Deng, et al. "Registration of Lidar and Optical Images Using Multiple Geometric Features", SPIE, Nov. 2007; vol. 6787.

Goncalvez, J.A., "Orientation of Spot Stereopairs by means of Matching a Relative DEM and the SRTM DEM", International Calibration and Orientation Workshop Eurocow 2006, Jan. 25, 2006.

Huber, M., et al., "Fusion of LIDAR Data and Aerial Imagery for Automatic Reconstruction of Building Surfaces", printed from the World Wide Web on May 19, 2009 at <http://www.sanborn.com/Pdfs/Article_Fusion_of_Lidar_Schickler.pdf>.

Lach, S. R., et al., Multisource Data Processing for Semi-Automated Radiometrically-Correct Scene Simulation: Urban Remote Sensing Joint Event, 2007, IEEE, PI LNKD Apr. 1, 2007, pp. 1-10.

Liu, et al., "Automatic 3D to 2D Registration for the Photorealistic Rendering of Urban Scenes", Computer Vision and Pattern Recognition, 2005, CVPR 2005 vol. 2, pp. 137-143.

Postolov, Y., et al., "Registration of Airborne Laser Data to Surface Generated by Photogrammetric Means" International Archives of Photogrammetry and Remote Sensing, Nov. 9, 1999, pp. 95-99.

Roman, C., et al, "A Self-Consistent Bathymetric Mapping Algorithm" Journal of Field Robotics, Wiley, USA, vol. 24, No. 1-2; Jan. 2007, pp. 23-50.

Schickler, W., et al., "Surface Estimation Based on Lidar", Published in: Proceeding of the ASPRS Annual Conference, St. Louis, Missouri, Apr. 2001.

Sofman, B., et al., "Terrain Classification from Aerial Data to Support Ground Vehicle Navigation" Internet Citation, Jan. 1, 2006, Retrieved from the Internet: URL:htto://www.ri.cmu.edu/pub_files/pub4/sofman_boris_2006_1/sofman_boris_2006_1.pef>.

Stamos, et al., "Automatic Registration of 2-D With 3-D Imagery in Urban Environments".

Williams, et al., "Simultaneous Registration of Multiple Point Sets Using Orthonormal Matrices". IEEE pp. 2199-2202.

Zollei, et al., "2D-3D Rigid Registration of X-Ray Fluoroscopy and CT Images Using Mutual Information and Sparsely Sampled Histogram Estimators", 2001 IEEE Computer Society Conference on Computer Vision and Pattern Recognition (CVPR 2001), vol. 2, p. 696.

Harris Corporation, International Patent Application No. PCT/US2010/023728, International Search Report mailed Aug. 4, 2010.

Kwang-Ho Bae, D. D. Lichti: "Automated Registration of Unorganised Point Clouds From Terrestrial Laser Scanners" International Archives of Photogrammetry and Remote Sensing, [Online] Jul. 12, 2004, XP002593550 Retrieved from the Internet: URL:http://www.isprs.org/proceedings/XXXV/congress/comm5/papers/553.pdf> [retrieved on Jul. 23, 2010] Section 1, Section 2 and subsections 2.1-2.4.

Bae K-H et al: "Pre-processing Procedures for Raw Point Clouds from Terrestrial Laser Scanners" Journal of Spatial Science, Spatial Sciences Institute, AU, vol. 52, No. 2, Dec. 1, 2007, pp. 65-74, XP008124682 ISSN: 1149-8596 the whole document.

Beinat et al., A direct method for the simultaneous and optimal multidimensional models registration, Nov. 8, 2001-Nov. 9, 2001, IEEE/ISPRS Joint Workshop 2001 Remote Sensing and Data Fusion over Urban Areas, pp. 283-287.

Demetrios Gatziolis: "Precise FIA Plot Registration Using Fieldand Dense LIDAR Data" Proceedings of the Eighth Annual Forest Inventory and Analysis Symposium, Oct. 16, 2006, pp. 243-249, XP002593551 * abstract; figures 2,3,; table 1 Sections "Introduction", "Data transcription to point patterns", "Point pattern matching".

In So Kweon et al: "High-Resolution Terrain Map From Multiple Sensor Data" IEEE Transactions on Pattern Analysis and Machine Intelligence, IEEE Service Center, Los Alamitos, CA, US LNKD-DOI:10.1109/34.121795, vol. 14, No. 2, Feb. 1, 1992, pp. 278-292, XP000248484 ISSN: 0162-8828 * abstract Section III Local Terrain Matching.

Kim et al.,Lecture Notes in Computer Science 2004: An Improved ICP Algorithm Based on the Sensor Projection for Automatic 3D Registration, 2004, Springer, vol. 2972/2004, pp. 642-651.

Chen, Liant-Chien, et al., "Fusion of Lidar Data and Optical Imagery for Building" [online] Retrieved from the Internet: citeseerx.ist.psu.edu/viewdoc/download?doi=10.1.1.129...—Similar <http://www.google.com/search?hl=en&biw=987&bih=584&q=related:citeseerx.ist.psu.edu/viewdoc/download%3Fdoi3D10.1.1.129.2409%26rep%3Drep1%26type%3Dpdf+fusion+of+lidar+data+and+optical&tbo=1&sa=X&ei=mp4lToyaBpDAgQey46C-DQ&ved=0CCQQHzAA> [Jun. 25, 2011].

Harris Corp., International Search Report mailed Aug. 6, 2010, Application Serial No.PCT/US2006/035661.

Alshawa, ICL: Iterative closest line, Dec. 2007, Ekscentar, No. 10, pp. 53-59.

Nuchter, et al., 6D SLAM with an Application in Authnomous Mine Mapping, Apr. 26-May 1, 2004, Proceeding of the 2004 IEEE Internatinoal Conference on Robotics an Automation, vol. 2, pp. 1998-2003.

Information about Related Patents and Patent Applications, see section 6 of the accompanying Information Disclosure Statement Letter, which concerns Related Patents and Patent Applications.

IMAGE REGISTRATION USING ROTATION TOLERANT CORRELATION METHOD

BACKGROUND OF THE INVENTION

1. Statement of the Technical Field

The inventive arrangements concern a new correlation technique that can be used to determine the degree of similarity between data sets. More particularly, the invention concerns correlation techniques which are relatively insensitive to rotational variations occurring in data sets such as image data and perform better than traditional correlation methods on data from disparate sensors.

2. Description of the Related Art

Image data for a particular scene is often obtained by one or more sensors at different times or from different perspectives. Consequently, the image data associated with each image will generally be defined in a different coordinate system due to the different perspective of the sensor when each such image is obtained. In other words, the point of view of the sensor may be different in each case. It is often desirable to combine two or more such images to create a composite image. However, the problem of combining the various images to form a single composite image can be difficult.

Computers can be programmed with various mathematical algorithms to combine image data of the same scene but obtained from different sensor perspectives. The term "image registration" refers to the process of transforming the different sets of data into a common coordinate system. Image registration is necessary in order to be able to compare or integrate the image data obtained from the same sensor in different positions or from different sensors at different times.

Various correlation methods are known in the art for purposes of performing image registration. One such method is known as the phase correlation method. The phase correlation method uses properties of the frequency domain to determine shifts between two images. Applying the Phase correlation method to a first and second image of a common scene will result in a correlation surface that ideally contains a single peak. Advantages of the phase correlation method are that a sharp peak is produced when the images are aligned and its robustness under noise and occlusions.

A second correlation technique for image registration is based on image similarity in the spatial domain (although a frequency domain implementation is well-known). It is referred to as normalized cross-correlation. A normalization step makes it invariant to illumination differences. An advantage of this method is the relatively slowly varying correlation surface. A disadvantage is that the peak is difficult to detect in the presence of noise. Other similarity metrics include mean absolute difference (MAD) and sum of squared differences, (SDD).

In the case of image alignment or registration, corresponding subregions within the overlapping area between two data sets are identified. A subregion is some area that is less than or equal to the overlapping region between the two data sets. For example, the overlapping area contained in each one of the two data sets can be divided into a plurality of subregions. Data in each of the corresponding subregions undergoes a correlation process. Conceptually this can be described as follows though the actual implementation may vary including a frequency domain implementation as is well known in this field. A small patch is formed about the center of the target image subregion. A larger patch is formed about the center of the reference image subregion. A patch is a two-dimension matrix of image pixels. To find the correlation between the two patches, the small patch is positioned over the large patch, the corresponding pixel values are multiplied, summed, and normalized. This value is called the correlation score. This is repeated at every location within the large patch in a sliding window manner. The correlation scores are saved in a two dimension grid called a correlation surface. The peak of this surface corresponds to the region within the reference patch that the target patch is most similar. The center location of the target patch along with it's best fit inside the reference patch are saved in the coordinate system of the original images. This process is performed for each subregion of interest. For each subregion, the location of the maximum correspondence is saved creating corresponding point sets. Finally, an optimization algorithm is used to minimize the distance between the corresponding point sets by changing parameters associated with a transformational model, for example an affine or polynomial warping.

Although the phase correlation method and the normalized cross-correlation method can be effective, both are sensitive to variations in the angle of the sensor relative to the scene for which the image data has been collected as well as sensor phenomenology differences. Both techniques demonstrate relatively poor performance in those cases where variations in sensor orientation respectively associated with two image pairs to be registered are greater than about three degrees.

SUMMARY OF THE INVENTION

The invention concerns a method for correlating data sets collected by one or more sensors where the data is disparate. The correlation techniques are particularly useful for correlations associate with registration of a plurality of frames of image data where the images are substantially rotated with respect to one another. The method begins by selecting a reference image set comprising a two-dimensional array of pixels obtained by a first sensor and defining a reference image data set for a scene. Thereafter, a target image data set is selected. The target image data set is comprised of a two dimensional array of pixels obtained by a second sensor and defining a target image data set for the scene. At least one of the target image set and the reference image set are pre-processed so that the target image set and the reference image set are projected to a common image plane using sensor attitude data and digital elevation data if available.

The method further includes calculating a first set of values comprising a phase correlation surface using a phase correlation technique. The phase correlation technique is applied to the reference image data set and the target image data set. This step also includes normalizing the phase correlation surface. Thereafter, a second set of values is calculated that comprises a normalized cross correlation (rho-correlation) surface. The rho-correlation surface is calculated using a normalized cross-correlation technique. Rho here refers to normalized cross-correlation.

Finally, a phase-rho correlation surface is calculated. This phase-rho correlation is determined by calculating an element-wise product based on the first set of values and the second set of values. The method further includes registering the reference image set with the target image set based on a position of a peak in the phase-rho correlation surface. The invention also includes a computer processing system for carrying out the method described herein.

DETAILED DESCRIPTION OF THE PREFERRED EMBODIMENTS

Figure 1:
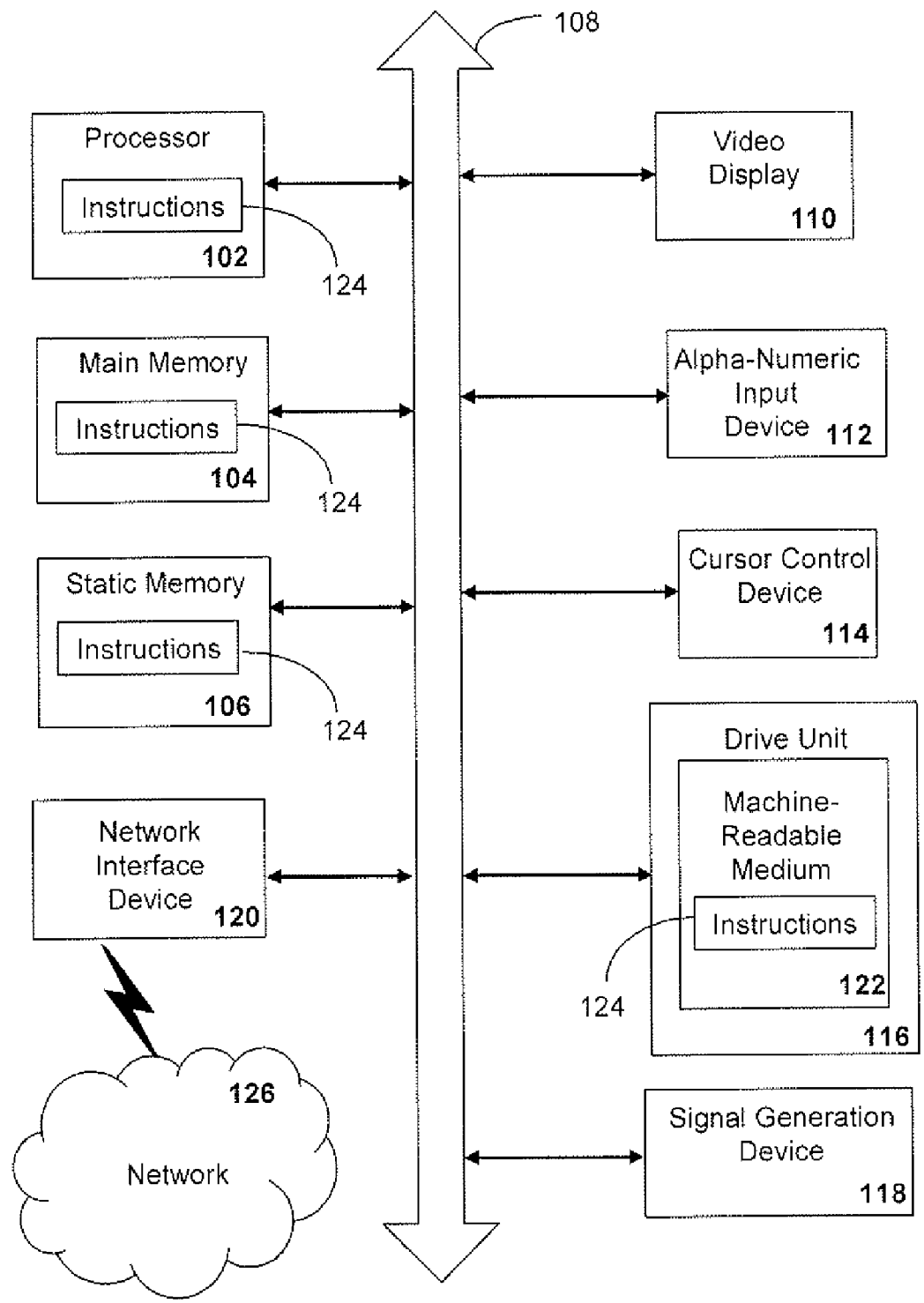
FIG. 1 is a block diagram of a computer system that is useful for understanding the invention.

The inventive arrangements concern a new correlation technique that can be used to determine the degree of similarity between data sets. It can be used for applications similar to those in which a normalized cross-correlation or other correlation methods are conventionally used. However, the new correlation technique described herein has unique advantages over each of these conventional methods. One such advantage is a relative insensitivity to rotational variations as are known to occur when attempting to register image data. Another advantage is better performance in cross-sensor registration.

More particularly, since the correlation technique described herein is relatively insensitive to rotation such as between two images to be registered, it can be advantageously used to find the transformation between images under rotation. The technique is particularly useful for rotations in excess of 3 degrees, where other correlation techniques are known to exhibit relatively poor performance. It also can be applied to 3D point cloud data once the data has been processed to resemble intensity data. For convenience, the invention will be described in the context of the registration of image data; however it should be understood that its use is not limited to this registration process or to image correlation generally. For example, the correlation techniques can be used for processing any target signal with a reference signal. The signals can be RF signals, data signal, audio signals or any other data representing a physical measurement. The correlation techniques herein can be used for correlating data sets of any kind. For example, the correlation techniques described herein are particularly useful when applied to data obtained from different sensors using similar sensing technology, different sensors using different sensor technology (i.e. different sensor phenomenology), the same sensor used at different times, and any other instances where two data sets to be correlated are similar or disparate.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The computer system 100 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 100 can include a processor 102 (such as a central processing unit (CPU), a graphics processing unit (GPU, or both), a main memory 104 and a static memory 106, which communicate with each other via a bus 108. The computer system 100 can further include a display unit 110, such as a video display (e.g., a liquid crystal display or LCD), a flat panel, a solid state display, or a cathode ray tube (CRT)). The computer system 100 can include an input device 112 (e.g., a keyboard), a cursor control device 114 (e.g., a mouse), a disk drive unit 116, a signal generation device 118 (e.g., a speaker or remote control) and a network interface device 120.

The disk drive unit 116 can include a computer-readable storage medium 122 on which is stored one or more sets of instructions 124 (e.g., software code) configured to implement one or more of the methodologies, procedures, or functions described herein. The instructions 124 can also reside, completely or at least partially, within the main memory 104, the static memory 106, and/or within the processor 102 during execution thereof by the computer system 100. The main memory 104 and the processor 102 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

In the various embodiments of the present invention, a computer-readable storage medium containing instructions 124 or that receives and executes instructions 124 from a propagated signal so that a device connected to a network environment 126 can send or receive voice and/or video data, and that can communicate over the network 126 using the instructions 124. The instructions 124 can further be transmitted or received over a network 126 via the network interface device 120.

While the computer-readable storage medium 122 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Those skilled in the art will appreciate that the computer system architecture illustrated in FIG. 1 is one possible example of a computer system. However, the invention is not limited in this regard and any other suitable computer system architecture can also be used without limitation Phase-Rho Correlation Process Overview Phase-Rho is the element-wise product of a conventional phase correlation (normalized so that its maximum value is 1.0) and a conventional normalized cross-correlation. The phase-rho correlation process has valuable properties when employed in the context of image registration. One such valuable property is the improvement in the peak to correlation surface ratio. Another advantageous property of this correlator is invariance to rotation. In particular, phase-rho correlation exhibits substantially improved performance where a coordinate system associated with a first image is rotated three degrees or more relative to the orientation or angular position of a second image. Changes in image orientation are a result of changes in the relative position or orientation of the image sensor used to collect the associated image. The relative local geometry of the sensor is termed its coordinate system. Therefore the transformation of points from one image to corresponding points in the other can be thought of as a change in the image coordinate system, which herein is how coordinate system will be defined.

Figure 2A:
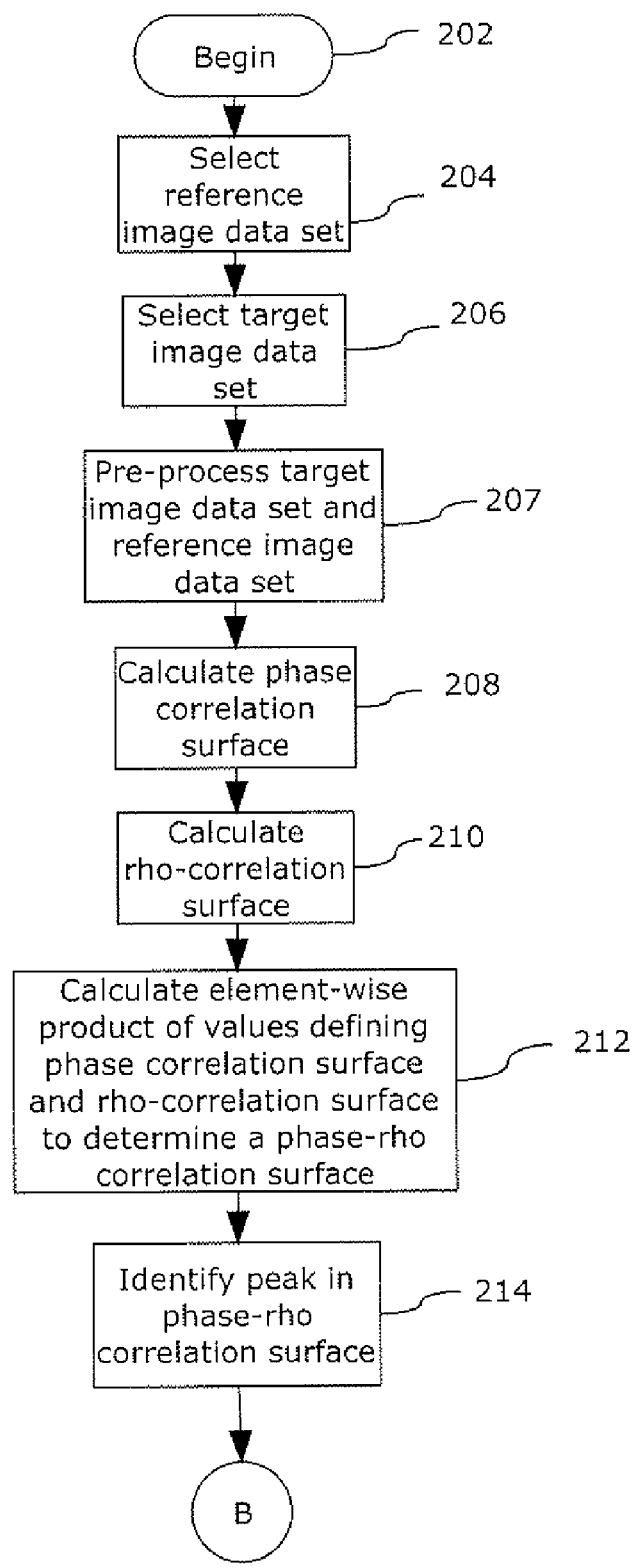
FIG. 2 is a flowchart of a registration process that is useful for understanding the invention.
Figure 2B:
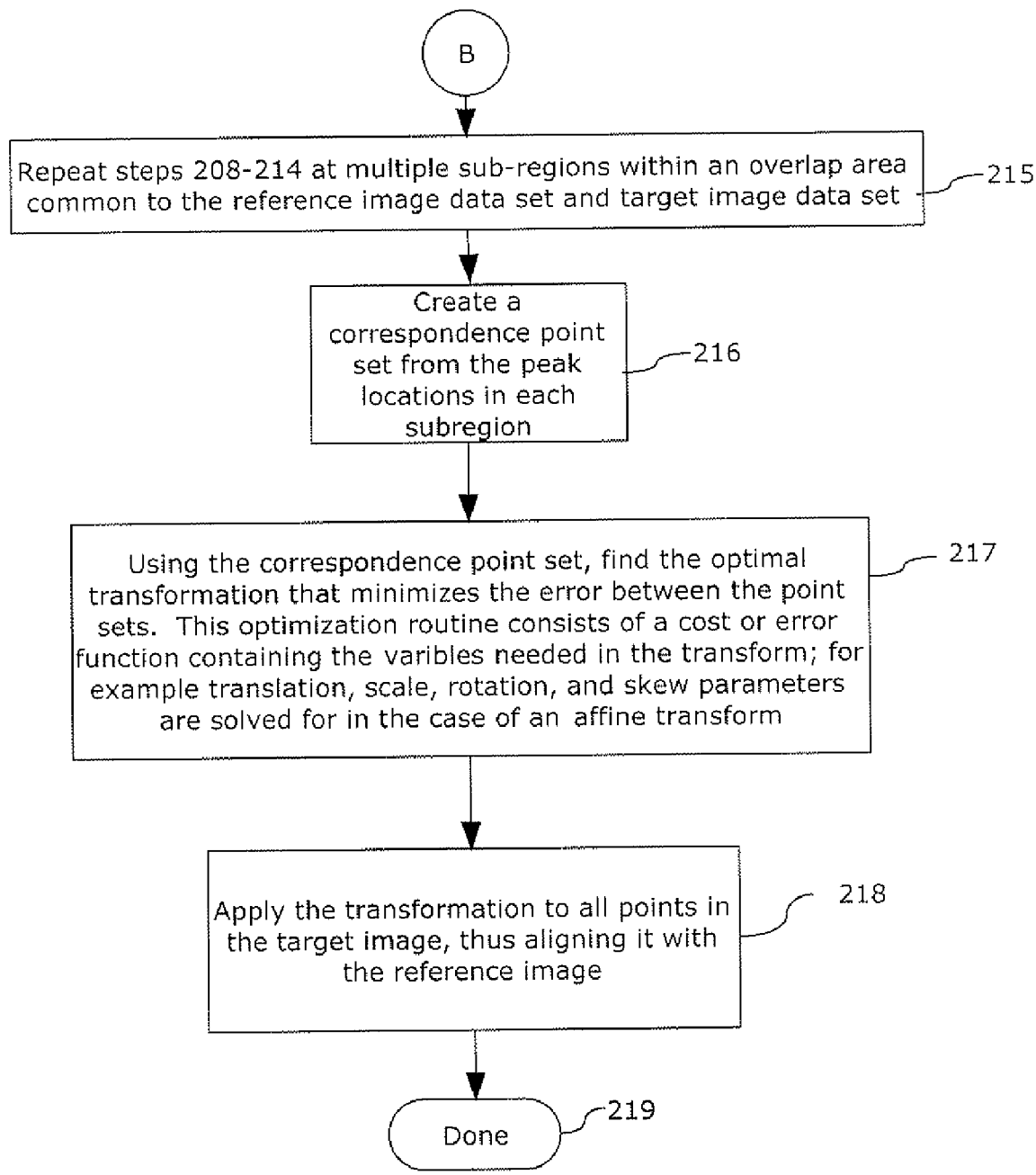

FIG. 2 is a flowchart that is useful for understanding the application of a phase-rho correlation method to an image registration process; however it should be understood that the invention is not limited in this regard. For example, the phase-rho correlation process can be used for correlating data associated with one dimensional data sets, two dimensional data sets, or even three dimensional data sets.

The process 200 in FIG. 2 begins in step 202 and continues with step 204. In step 204, a reference image set is selected. The reference image set is comprised of a two-dimensional array of pixels obtained by a first sensor. The two dimensional array of pixels defines a reference image data set for subject matter contained in a particular scene. The scene can be any area associated with a defined physical location or subject matter. In step 206, a target image data set is selected. The target image data set is similarly comprised of a two dimensional array of pixels. The target image data set is obtained by a second sensor and defines a target image data set for the scene. The target image data set is selected so that there is at least some overlap with the reference image data set. Stated differently, this means that the target data set will contain image data for at least some subject matter which is also present in the reference image data set.

As used herein, the term "first sensor" and "second sensor" can be two physically different sensors. However, the first sensor and the second sensor can also include a single sensor, provided that the reference image set and the target image set are obtained in accordance with at least one distinguishable image collection variable. For example, the same sensor can be used to collect the reference image set and the target image set at different times, from different relative position, and from different sensor orientations. In this sense, the time, relative position and sensor orientation are considered image collection variables.

The method continues in step 207 with a pre-processing step. For two dimensional (2D) imagery, the pre-processing step involves modifying at least one of the target image set and the reference image set so that the target image set and the reference image set are projected to a common image plane. The images will appear as though they were taken from a sensor at the same location and orientation. For example for 2D image frames, each pixel in each image can be re-projected using elevation data (or a height map of the scene, if available), to a nadir view (looking straight down at the scene). This enables a one-to-one correspondence of image pixels. This step is not needed for three-dimensional (3D) imagery since each point is uniquely defined in 3-space.

Steps 208-215 involve calculating a set of normalized cross-correlation values and a set of phase correlation values for each one of a plurality of sub-regions within the overlap area. The set of normalized cross-correlation values and the set of phase correlation values each define a 3-D correlation surface Each set of cross-correlation values is calculated using the reference data set and the target data set in order to evaluate a plurality of possible positions of the target data within the reference data. Thereafter, an element by element product of the normalized cross-correlation set and the phase correlation set is computed to determine a phase-rho correlation set for each of the sub-regions within the overlap area. The phase-rho correlation set also defines a 3-D correlation surface. Finally, a correlation surface peak location is identified for each sub-region. The correlation surface peak is the highest value in the phase-rho correlation set for each sub-region.

As will be appreciated by those skilled in the art, the phrase "3-D correlation surface" extends over a plane defined by x, y coordinate axes and will exhibit surface peaks extending in a z direction of the coordinate system. A peak in the surface at a particular x, y location identifies the degree of correlation which exists between a reference image set and a target image set at that x, y location. A 2-D correlation surface can be thought of as an image created by moving a two dimensional adjacent group of image (target) pixels to every possible position within a larger group of adjacent pixels in the reference image. For each target location choice, a correspondence value is calculated. The grid of such correspondence values form a surface where the x, y locations represent the center position of the smaller target patch with respect to the larger reference patch. The correspondence value is the 'z' value which defines the contours of a 3-D correlation surface. 3-D correlation surfaces as described herein are well known by those skilled in the art.

Steps 208-214 will now be described in further detail. In step 208, the phase correlation surface is calculated for a particular sub-region of the overlap area. The phase correlation surface is calculated using a conventional phase correlation method applied to the reference image data set and the target image data set. Methods and techniques for phase correlation are well known in the art. Step 208 also advantageously includes a further processing step which normalizes the phase correlation surface so that it has a maximum value of 1.

In step 210, the method continues with the step of calculating a second set of values comprising a rho-correlation surface for a particular sub-region of the overlap area. The rho-correlation surface is calculated using a normalized cross-correlation technique. Methods and techniques are well known in the art for performing a normalized cross-correlation based on data associated with a first and second image.

In step 212, the method continues by calculating an element-wise product based on the first set of values (defining the phase correlation surface) and the second set of values (defining the rho-correlation surface). As used herein, the phrase element-wise product refers to a matrix multiplication operation applied on an element-by-element basis. For example in an element-wise product, an element in each position within a first matrix A (in this case a matrix of values defining the phase correlation surface) is multiplied by a corresponding element in the same matrix position in a matrix B (a matrix of values defining the rho-correlation surface). The result is a third matrix whose dimensions are identical with those of the original matrices. The resulting element-wise product of these two distinct correlation surfaces defines a phase-rho correlation surface.

The method continues in step 214 by identifying a peak in the phase-rho correlation surface calculated for a particular sub-region. Notably, a conventional phase correlation surface and a conventional rho-correlation surface will typically have many peaks where the rotation angle between a target image and a reference image is about three degrees or more. Accordingly, conventional methods typically involve identifying a highest value peak among many such peaks in such cases. For such conventional methods, erroneous results are often obtained with angles greater than about three degrees. In contrast, it has been found that the phase-rho correlation surface will generally provided a clearly identifiable peak in the correlation surface having a high peak to correlation surface ratio for image rotation angles which differ by more than three degrees. In fact, the phase-rho correlation surface has been found to provide useful results (i.e. an identifiable peak in the correlation surface) for angles as large as nineteen degrees (19°). This represents a distinct improvement as compared to simple phase correlation or normalized cross-correlation techniques.

Once the peak in the phase-rho correlation surface for a particular sub-region has been identified in step 214, the process is complete with respect to that sub-region. In step 215, the processes described in steps 208-214 are repeated at multiple sub-regions in the area of overlap as between the reference image and the target image. These sub-regions or locations can be evenly spaced or selected in areas of high scene content in the overlap area between the two images.

For each sub-region processed in steps 208-214, a peak in the phase-rho correlation surface is identified. The correlation peaks determine the x, y (or x, y, z) correspondence points between the images defined by the reference image set and the target image set. Thereafter, in step 216 a correspondence point set is created from the peak locations in each subregion of interest. In step 217 the correspondence point set is used to find the optimal transformation that minimizes the error between the point sets. This optimization routine consists of a cost or error function containing the variables needed in the transform; for example translation, scale, rotation, and skew parameters are solved for in the case of an affine transform. Finally, in step 218 the transformation identified in step 217 is applied to all points in the target image, thus aligning it with the reference image. In step 219, the process terminates.

The image transformation metric can be an affine transform or nonlinear warping, but the invention is not limited in this regard. The optimization routine determines a transformation that minimizes the distance between the reference data set point locations and the corresponding point locations in the target data set to align the target data set with the reference data set.

In the following paragraphs, a more detailed description is provided for phase correlation, normalized cross-correlation, and phase-rho correlation.

Phase Correlation

As used herein, the word "template" refers to a pixel pattern that needs to be matched or located in the reference image. It is a selected portion of the target image which is moved relative to a larger group of pixels from the reference image until a 'match' (highest correlation score) is found. It is a template in the sense that a match to the scene content represented in that portion of the data, is searched for in the reference image. When that match is found, the transformation between the images can be calculated.

If t(x, y) represents a selected portion of the target image (the "template") and $f(x, y)$ represents the reference image (the "image"), F(·) represents the Fourier transform and $F^{-1}(\cdot)$ represents the inverse Fourier transform, then the Phase Correlation is:

$$c_{phase}(u, v) = \mathcal{F}^{-1}\left(\frac{\mathcal{F}(f(x, y))\mathcal{F}(t(x, y))^*}{\|\mathcal{F}(f(x, y))\mathcal{F}(t(x, y))^*\|}\right) \quad (1)$$

That is, the element-wise conjugate product of the two Fourier transforms is normalized in magnitude (whitened) before taking the inverse Fourier transform. (Some variations apply other filters to the Fourier components rather than pure whitening.) Furthermore, if $f(x, y)$ and t(x, y) are zero-mean, then the only effect is that F(0,0) and T(0,0) are each zero. If appropriate care is taken when normalizing the frequency coefficients (that is, if the coefficient is zero then no attempt is made to "normalize" its magnitude), then $c_{phase}$ (u, v) will be zero-mean, but its shape will be unchanged. That is, if $f(x, y)$ and $t(x, y)$ are each modified with a constant offset to create zero-mean versions, phase correlation between the modified images will also differ only by a constant offset from the phase correlation between the original images.

Normalized Cross-Correlation

The normalized cross-correlation ("NCC") is:

$$c_{ncc}(u, v) = \frac{\sum_{x,y}(f(x, y) - \bar{f}_{u,v})(t(x - u, y - v) - \bar{t})}{\sqrt{\sum_{x,y}(f(x, y) - \bar{f}_{u,v})^2} \cdot \sqrt{\sum_{x,y}(t(x - u, y - v) - \bar{t})^2}} \quad (2)$$

Where $\bar{f}_{u,v}$ is the mean of the pixels under the template.

Where $\bar{f}_{u,v}$ is the mean of $f(x, y)$ in the region under the template t (shifted by u, v), and $\bar{t}$ is the mean of the template. Thereafter, a mathematical treatment is applied which follows that described in: Lewis, J. P. 1995. "Fast Normalized Cross-Correlation", *Vision Interface '95* 8:120-123, which papers is expressly incorporated herein by reference. Those skilled in the art will appreciate that this 'fast' method is not the only way to implement this formula. There is the direct method which calculates the numerator and denominator of Equation 2 at every possible position of the template within the reference patch. By following that treatment and defining the function $t'(x, y) \equiv (x, y) - \bar{t}$, the family of functions $f'(x, y) \equiv f(x, y) - \bar{f}_{u,v}$, and the function $f''(x, y) \equiv f(x, y) - \bar{f}$ (where $\bar{f}$ is the mean of $f(x, y)$ over its entire domain), the numerator of (2) can be expressed as:

$$\begin{aligned}
{}^{num}c_{ncc}(u, v) &= \sum_{x,y} f'(x, y) t'(x - u, y - v) \quad (3)\\
&= \sum_{x,y}(f(x, y) - \bar{f}_{u,v} + \bar{f} - \bar{f}) t'(x - u, y - v)\\
&= \sum_{x,y}(f(x, y) - \bar{f}) t'(x - u, y - v) -\\
&\quad (\bar{f}_{u,v} - \bar{f})\sum_{x,y} t'(x - u, y - v)\\
&= \sum_{x,y} f''(x, y) t'(x - u, y - v)
\end{aligned}$$

The first simplification is possible because $\bar{f}_{u,v}$ is a constant with respect to x, y, and can be pre-computed for all u, v. The second simplification is possible because t' is zero-mean. But Equation (3) is the convolution of $f''(x, y)$ with $t''(-x, -y)$, which is efficiently computed in the Fourier domain using:

$$^{num}c_{ncc}(u, v) = \mathcal{F}^{-1}(\mathcal{F}(f''(x, y))\mathcal{F}(t'(x, y))^*) \quad (4)$$

Of the two terms in the denominator of (2), the second is a constant for all u, v and can be pre-computed. However, the first term is problematic: the image mean and local energy must be computed at every u, v. An efficient method of computing these values employs the "integral image" trick, where the following tables are constructed:

$$s(u,v) = f(u,v) + s(u-1,v) + s(u,v-1) - s(u-1,v-1)$$

$$s^2(u,v) = f^2(u,v) + s^2(u-1,v) + s^2(u,v-1) - s^2(u-1,v-1)$$

$$s(u,v) = s^2(u,v) = 0 \,\forall u < 0 \cup v < 0 \quad (5)$$

Then, the image sum (under the template) and local energy (under the template) can be computed as:

$$\begin{aligned}
s_f(u, v) &= s(u + N_x - 1, v + N_y - 1) -\\
&\quad s(u - 1, v + N_y - 1) -\\
&\quad s(u + N_x - 1, v - 1) +\\
&\quad s(u - 1, v - 1)\\
e_f(u, v) &= s^2(u + N_x - 1, v + N_y - 1) -\\
&\quad s^2(u - 1, v + N_y - 1) -\\
&\quad s^2(u + N_x - 1, v - 1) +\\
&\quad s^2(u - 1, v - 1)
\end{aligned} \quad (6)$$

Where $N_x$ and $N_y$ are the dimensions of the template $t(x, y)$ in the x and y directions, respectively.

$$\begin{aligned}
\sum_{x,y}(f(x, y) - \bar{f}_{u,v})^2 &= \sum_{x,y} f^2(x, y) - 2\bar{f}_{u,v}\sum_{x,y} f(x, y) +\\
&\quad \sum_{x,y} \bar{f}_{u,v}^2\\
&= e_f(u, v) - 2\bar{f}_{u,v} s_f(u, v) + N_x N_y \bar{f}_{u,v}^2\\
\bar{f}_{u,v} &= \frac{1}{N_x N_y}\sum_{x,y} f(x, y) = \frac{s_f(u, v)}{N_x N_y}\\
\sum_{x,y}(f(x, y) - \bar{f}_{u,v})^2 &= e_f(u, v) - 2\frac{(s_f(u, v))^2}{N_x N_y} +\\
&\quad N_x N_y \frac{(s_f(u, v))^2}{N_x^2 N_y^2}\\
&= e_f(u, v) - \frac{(s_f(u, v))^2}{N_x N_y}
\end{aligned} \quad (7)$$

If $f(x, y)$ is replaced by the (overall) zero-meaned $f''(x, y)$, then while the contents of the tables $s(u, v)$ and $s^2(u, v)$ are different, the denominator term computed using those tables is unchanged:

$$\begin{aligned}
\sum_{x,y}(f(x, y) - \bar{f}_{u,v})^2 &= \sum_{x,y}(f(x, y) - \bar{f} - \bar{f}_{u,v} + \bar{f})^2\\
&= \sum_{x,y}((f(x, y) - \bar{f}) - (\bar{f}_{u,v} - \bar{f}))^2\\
&= \sum_{x,y}(f''(x, y) - \bar{f}''_{u,v})^2\\
&= \hat{e}_f(u, v) - \frac{(\hat{s}_f(u, v))^2}{N_x N_y}
\end{aligned} \quad (8)$$

Where $\bar{f}_{u,v}''$ represents the local mean of the (globally) zero-meaned image $f''(x, y)$, and $\hat{e}_f(u, v)$ $\hat{s}_f(u, v)$ are computed according to (5) and (6), except that $f''(x, y)$ is used instead of $f(x, y)$.

Phase-Rho Correlation

Given the preceding analysis, we are now prepared to describe the phase-rho correlation process as implemented. Set forth in the following Table 1 are input parameters for the phase-rho correlation. Also provided in Table 1 is the category or type of parameter, the name of the parameter, and a brief description of the parameter. Table 2 lists the output parameters associated with the phase-rho correlation method. Note that in Table 1, the letter "I" refers to integers having values which are greater than or equal to zero.

TABLE 1

Inputs for Phase-Rho Correlation

| Parameter | Category | Name | Description |
|---|---|---|---|
| Target image set | constant | t(x, y) | 2D array of pixel values (x, y ∈ I, ≧0) |
| Target image set size | constant | $N_x, N_y$ | dimensions of the target image set in the x and y directions. $0 < N_x < M_x$, $0 < N_y < M_y$ |
| Reference image set | constant | f(x, y) | 2D array of pixel values (x, y ∈ I, ≧0) |
| Reference image set size | constant | $M_x, M_y$ | dimensions of the reference image set in the x and y directions. $0 < N_x < M_x$, $0 < N_y < M_y$ |

TABLE 2

Outputs for Phase-Rho Correlation

| Parameter | Category | Name | Description |
|---|---|---|---|
| Correlation surface | constant | c(u, v) | 2D array of correlation values (u, v ∈ I). $0 < u < M_x - N_x + 1$, $0 < v < M_y - N_y + 1$ |

The algorithm associated with the phase-rho correlation technique shall now be described in further detail. First, both t(x, y) and f(x, y) are replaced by the globally zero-meaned arrays:

$$t'(x,y) = t(x,y) - \bar{t}$$

$$f''(x,y) = f(x,y) - \bar{f} \quad (9)$$

Next, the normalization surface for the "rho" (normalized cross-correlation) portion is computed. This is the denominator term in (2); the computation is a multi-step process:

1. Compute the template (target image set) power $$P_t = \sum_{\substack{0 \leq x < N_x - 1 \\ 0 \leq y < N_y - 1}} (t(x,y) - \bar{t})^2 = \sum_{\substack{0 \leq x < N_x - 1 \\ 0 \leq y < N_y - 1}} (t'(x,y))^2$$

2. Compute the image integrals $\hat{s}(u, v)$ and $\hat{s}^2(u, v)$ according to (5) and (6), using the (globally) zero-meaned reference image set $f''(x, y)$. The image integrals have size $M_x+1, M_y+1$, and the values are computed sequentially using an upwind pattern:

a. First row (v=0)
  i. Compute the first value (u=0)

$$\hat{s}(0,0) = f''(0,0)$$

$$\hat{s}^2(0,0) = \hat{s}(0,0) \cdot \hat{s}(0,0)$$

ii. Compute interior values for the first row ($0 < u < M_x$)

$$\hat{s}(u,0) = f''(u,0) + \hat{s}(u-1,0)$$

$$\hat{s}^2(u,0) = f''(u,0) \cdot f''(u,0) + \hat{s}^2(u-1,0)$$

iii. Compute the "one-past-the-end" value for the first row ($u = M_x$)

$$\hat{s}(M_x,0) = \hat{s}(M_x-1,0)$$

$$\hat{s}^2(M_x,0) = \hat{s}^2(M_x-1,0)$$

b. Interior rows ($0 < v < M_y$)
  i. Compute the first value (u=0)

$$\hat{s}(0,v) = f''(0,v) + \hat{s}(0,v-1)$$

$$\hat{s}^2(0,v) = f''(0,v) \cdot f''(0,v) + \hat{s}^2(0,v-1)$$

ii. Compute interior values for the interior rows ($0 < u < M_x$)

$$\hat{s}(u,v) = f''(u,v) + \hat{s}(u-1,v) + \hat{s}(u,v-1) - \hat{s}(u-1,v-1)$$

$$\hat{s}^2(u,v) = f''(u,v) \cdot f''(u,v) + \hat{s}^2(u-1,v) + \hat{s}^2(u,v-1) - \hat{s}^2(u-1,v-1)$$

iii. Compute the "one-past-the-end" value for the interior rows ($u = M_x$)

$$\hat{s}(M_x,v) = \hat{s}(M_x-1,v) + \hat{s}(M_x,v-1) - \hat{s}(M_x-1,v-1)$$

$$\hat{s}^2(M_x,v) = \hat{s}^2(M_x-1,v) + \hat{s}^2(M_x,v-1) - \hat{s}^2(M_x-1,v-1)$$

c. "One-past-the-bottom" row ($v = M_y$)
  i. Compute the first value (u=0)

$$\hat{s}(0,M_y) = \hat{s}(0,M_y-1)$$

$$\hat{s}^2(0,M_y) = \hat{s}^2(0,M_y-1)$$

ii. Compute interior and "one-past-the-end" values for the "one-past-the-bottom" row ($0 < u \leq M_x$)

$$\hat{s}(u,M_y) = \hat{s}(u-1,M_y) + \hat{s}(u,M_y-1) - \hat{s}(u-1,M_y-1)$$

$$\hat{s}^2(u,M_y) = \hat{s}^2(u-1,M_y) + \hat{s}^2(u,M_y-1) - \hat{s}^2(u-1,M_y-1)$$

3. Compute the denominator term in (2). However, because this divisor will be applied following an inverse discrete Fourier transform ("IDFT"), we combine the IDFT normalization factor $1/(N_{DFT,x} N_{DFT,y})$, where $N_{DFT,x}$ and $N_{DFT,y}$ are the dimensions of the transform. These should be the power-of-two greater than or equal to the dimensions of the correlation surface itself:

$$N_{DFT,x} = 2^{\left\lceil \frac{\log(M_x - N_x + 1)}{\log 2} \right\rceil} \quad (10)$$

$$N_{DFT,y} = 2^{\left\lceil \frac{\log(M_y - N_y + 1)}{\log 2} \right\rceil}$$

For each $u,v: 0 < u < M_x - N_x + 1, 0 < v < M_y - N_y + 1$
  a. Compute the value of $\hat{s}_f(u, v)$ according to Equation (6), using $\hat{s}(u, v)$
  b. Compute the value of $\hat{e}_f(u, v)$ according to Equation (6), using $\hat{s}^2(u, v)$ c. Compute the power (of the reference image set) under the template at this u, v according to Equation (8):

$$P_f = \hat{e}_f(u, v) - \frac{(\hat{s}_f(u, v))^2}{N_x N_y}$$

d. Finally, compute the value of the normalization surface (that is, the denominator of Equation (2), with the IDFT adjustment described above:

$$^{den+idft}c_{ncc}(u, v) = N_{DFT,x} N_{DFT,y} \sqrt{P_f(u, v) \cdot P_t} \quad (11)$$

Next, the (globally) zero-meaned arrays are zero-padded to the dimensions appropriate for the discrete Fourier transform (that is, to $N_{DFT,x}$ by $N_{DFT,y}$), and the Fourier transforms are computed:

$$T(k_x, k_y) = F(t_{zero-pad}'(x,y))$$

$$F(k_x, k_y) = F(f_{zero-pad}''(x,y)) \quad (12)$$

Then, the frequency-domain terms in Equation (4) and Equation (1) are computed:

$$^{num}C_{ncc}(k_x, k_y) = F(k_x, k_y) T^*(k_x, k_y) \quad (13)$$

$$C_{phase}(k_x, k_y) = \begin{cases} \frac{^{num}C_{ncc}(k_x, k_y)}{\left\|^{num}C_{ncc}(k_x, k_y)\right\|} & \left\|^{num}C_{ncc}(k_x, k_y)\right\| \neq 0 \\ 0 & \left\|^{num}C_{ncc}(k_x, k_y)\right\| = 0 \end{cases}$$

Next, the separate rho- and phase-correlation surfaces are computed:

$$^{num}c_{ncc}(u, v) = \mathcal{F}^{-1}\left(^{num}C_{ncc}(k_x, k_y)\right) \quad (14)$$

$$c_{ncc}(u, v) = \begin{cases} \dfrac{^{num}c_{ncc}(u, v)}{^{den+idft}c_{ncc}(u, v)} & \left|^{den+idft}c_{ncc}(u, v)\right| > \varepsilon \\ 0 & \left|^{den+idft}c_{ncc}(u, v)\right| \leq \varepsilon \end{cases},$$

$$\varepsilon = 2.22 \times 10^{-16}$$

$$c_{phase}(u, v) = \frac{1}{N_{DFT,x} N_{DFT,y}} \mathcal{F}^{-1}(C_{phase}(k_x, k_y))$$

Finally, the maximum value of the phase-correlation surface is computed and the phase-rho correlation is completed:

$$\text{scale} = \max_{u,v}(c_{phase}(u, v)) \quad (15)$$

$$c_{phase-rho}(u, v) = c_{ncc}(u, v) \cdot \frac{c_{phase}(u, v)}{\text{scale}}$$

Figure 3A:
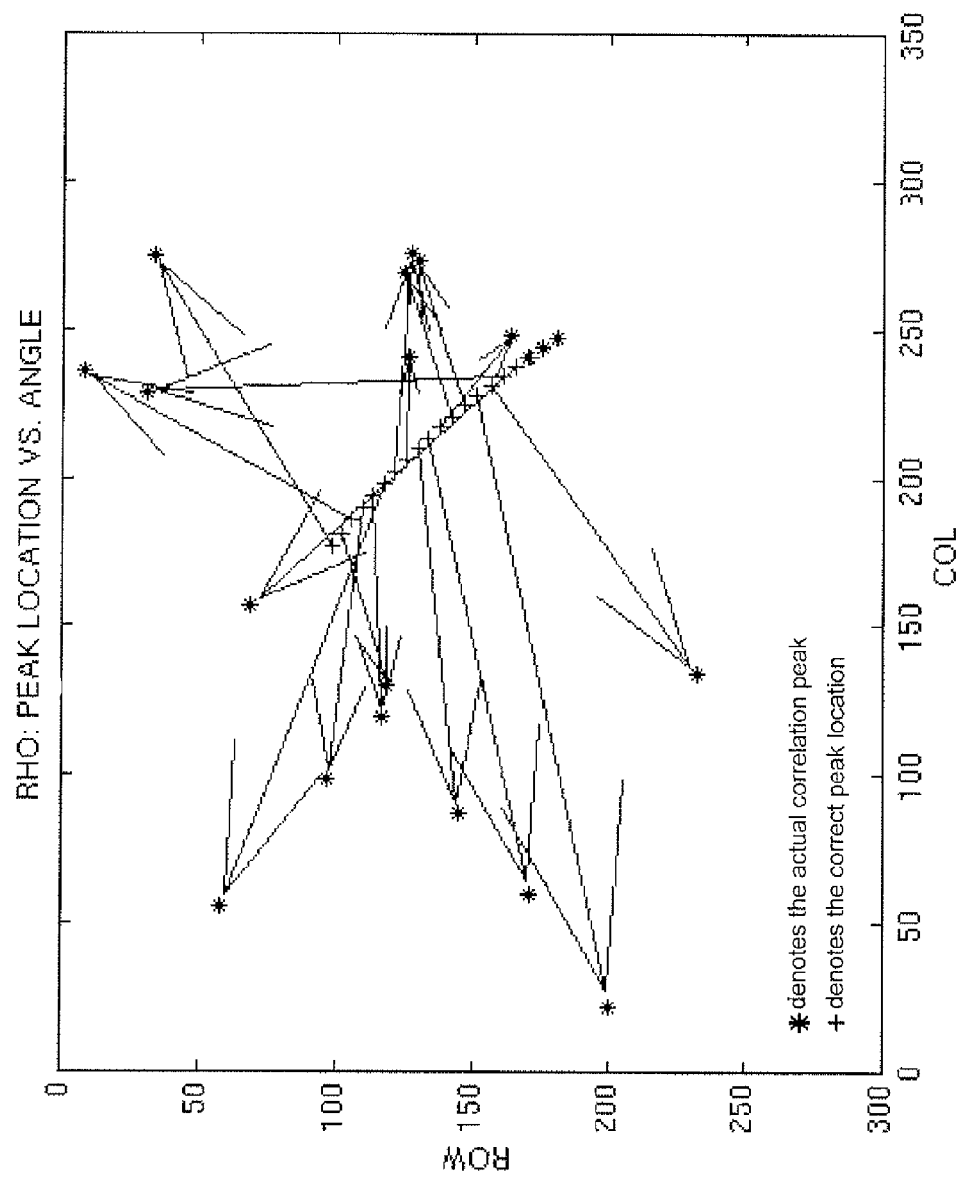
FIGS. 3A-3C are a set of graphs which shows the "peak finding" ability of different correlation techniques as compared to the phase-rho correlator for relative angular mismatch between two images from 0 to 19 degrees.
Figure 3B:
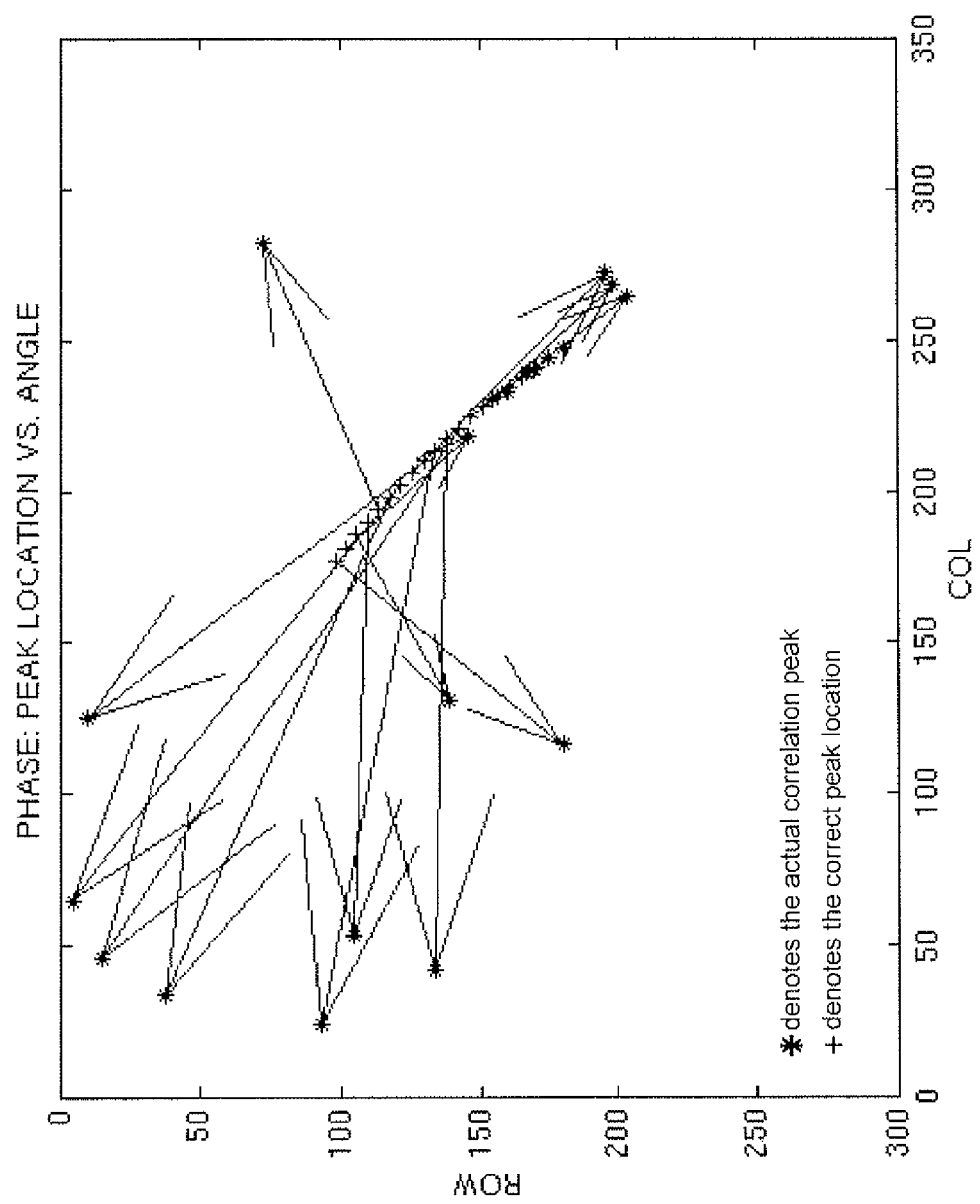

Unlike NCC or phase correlation alone, the phase-rho correlator is relatively insensitive to rotation between the two images. This is illustrated in FIG. 3A-3B, which respectively model the "peak finding" ability of NCC alone, phase correlation alone, and the phase-rho correlator for relative angular mismatch between the two images at various angles from 0 to 19 degrees. In FIGS. 3A-3B, the asterisk symbols * denote the actual correlation peak produced by the NCC, phase, or phase-rho correlation process. By way of comparison, the + symbols denote the correct peak location. Arrows are used in each figure to denote the correspondence between the two symbols at each angle. To create the plots in FIGS. 3A-3B, the template patch was rotated with respect to the reference patch. At each rotation angle, a correlation surface was generated. The maximum of the correlation surface corresponds to the correct transformation between the patches. The highest peak location corresponds to the correct peak location for all angles considered.

In FIG. 3A, it can be observed that a conventional normalized cross-correlation (Rho correlator) results in significant errors over the range of angles from 0 to 19 degrees. Similarly, FIG. 3B shows that phase correlation gives erroneous results for many rotation angles in the same range from 0 to 19 degrees. In contrast, the results from the phase-rho correlation method show minimal error over the entire range of angles from 0 to 19 degrees. It can be observed from FIG. 3C that a substantially improved performance results from use of the phase-rho technique described herein.

Figures 4A, 4B, 4C:
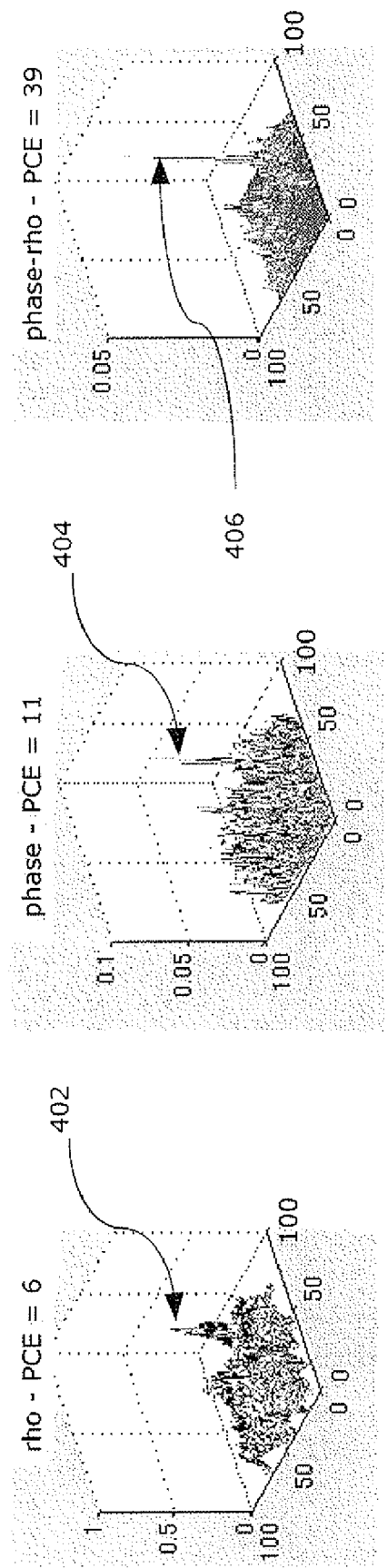
FIGS. 4A-4C are cross sensor correlation surfaces obtained using rho, phase, and phase-rho type correlations.

The phase-rho correlator was also shown to produce a sharper correlation peak when the two images were taken from different sensors: cross-sensor registration. The correlation surfaces shown in FIGS. 4A-4C were calculated for image data sets taken from two different sensors: SAR and EO. FIGS. 4A-4B there are correlation surfaces computed using conventional rho (NCC) and phase type correlation methods, respectively, for the same data. In contrast, FIG. 4C shows the correlation surface for the same data using a phase-rho correlation method as described herein. It can be observed in FIGS. 4A-4C that the phase-rho correlator also produces a much sharper correlation peak 406 as compared to the correlation peaks 402, 404 obtained with the rho or phase correlation methods alone. This advantage is evident when the correlation surfaces are evaluated using the Modified Peak-to-Correlation Energy metric (PCE' metric), which is defined as follows:

$$PCE' = \frac{\max_{u,v}(c(u, v))}{\sqrt{\sum_{u,v} |c(u, v)|^2 - \left|\max_{u,v}(c(u, v))\right|^2}}$$

Reference this equation to Joseph Horner

This equation was presented in Applied Optics, Vol. 31, No. 2, 10 Jan. 1992, in an article entitle Metrics for Assessing Pattern-Recognition Performance, by Joseph L Horner, Rome Laboratory, Hanscom Air Force Base, Mass. 01731-5000. Applying the PCE' metric to the correlation surfaces in FIGS. 4A-4C, results in PCE' score of 6 for the rho correlation surface in FIG. 4A, 11 for the phase correlation surface in FIG. 4B, and 39 for the phase-rho correlation surface in FIG. 4C. It can be observed in 4A and 4B that the area surrounding the peaks 402, 404 is noisy compared to the areas surrounding peak 406 in FIG. 4C. Accordingly, the higher PCE' score obtained for the correlation surface in FIG. 4C is consistent with expectations based on a visual evaluation of the three surfaces shown.

Figure 3C:
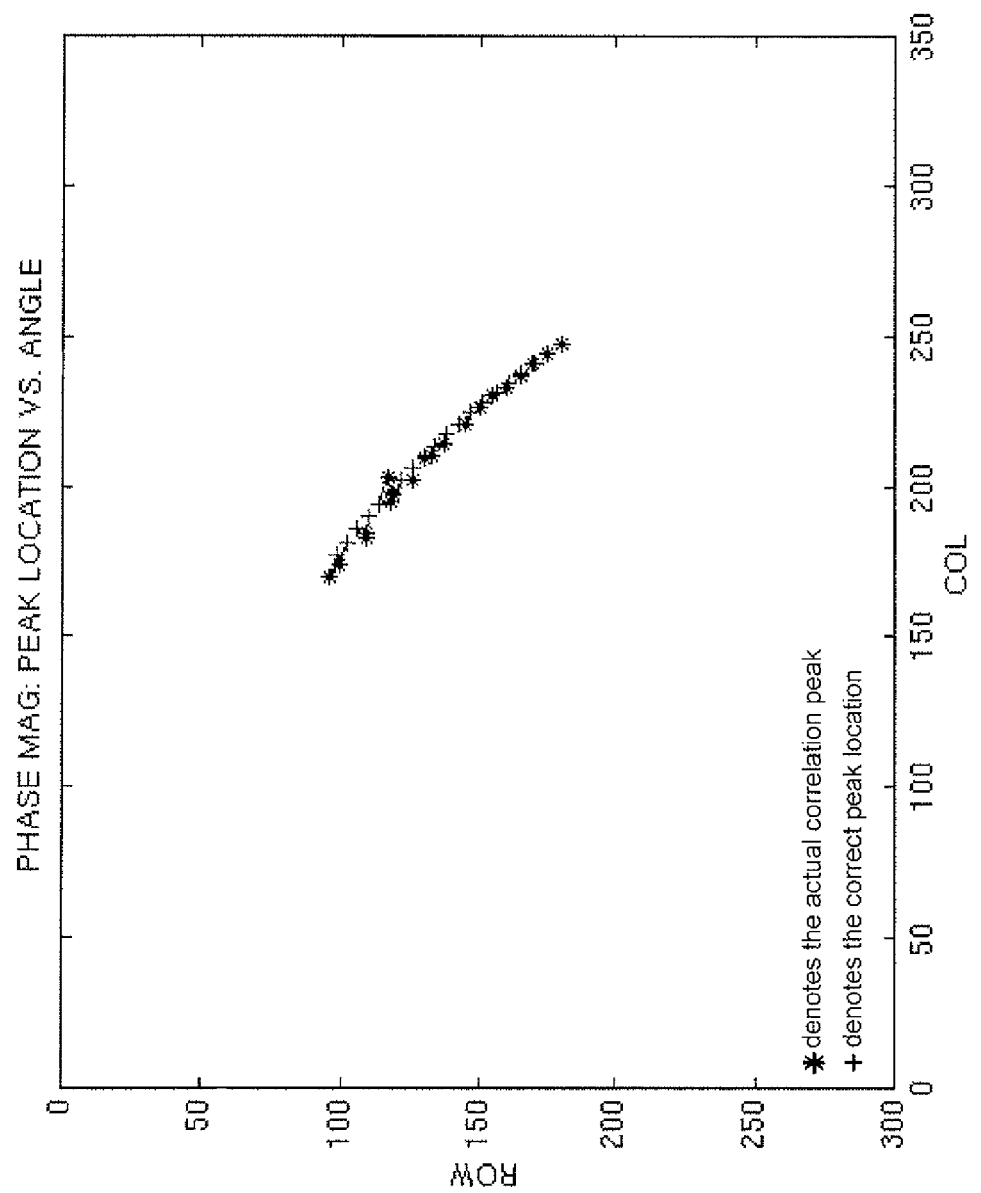
Figure 5:
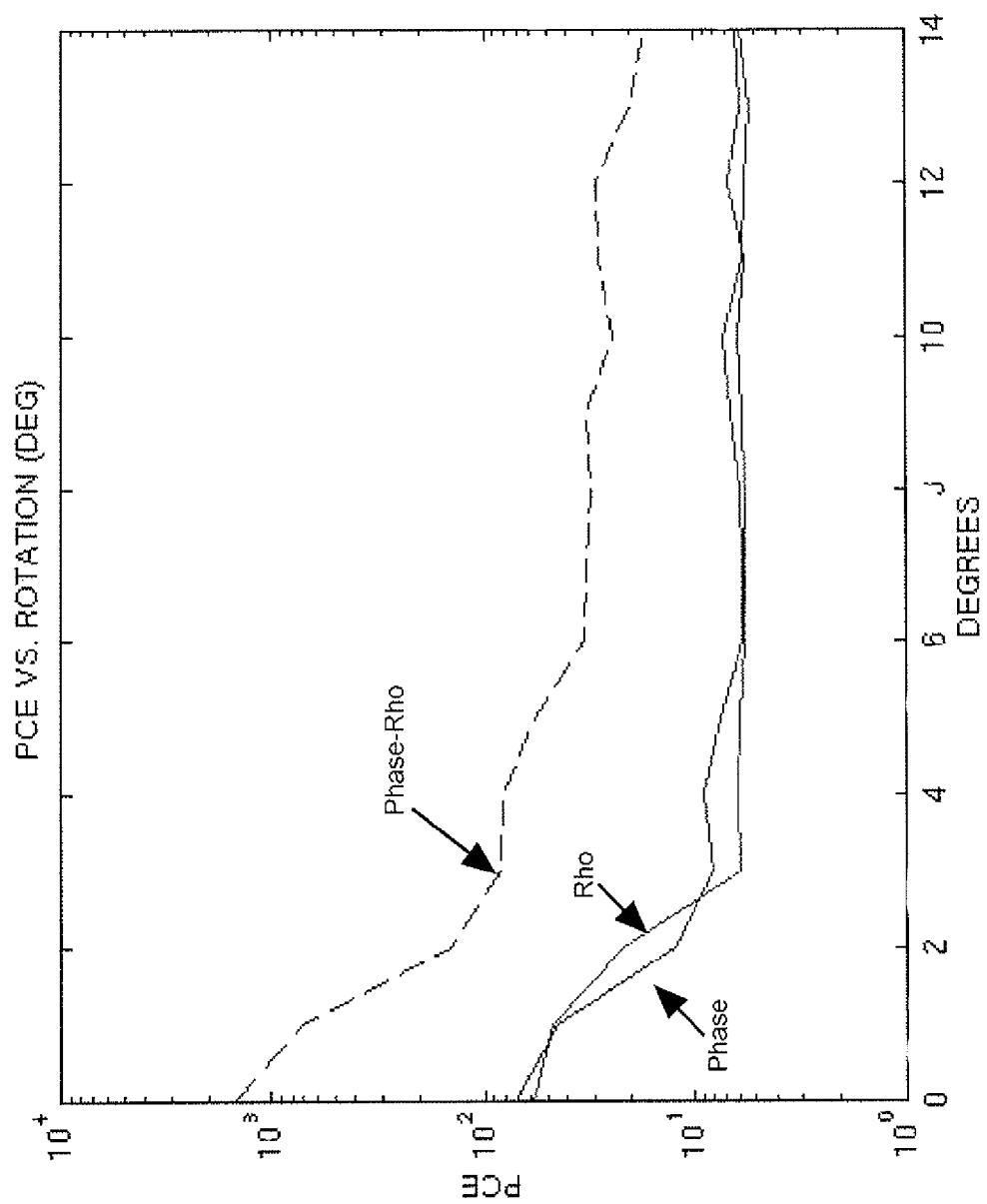
FIG. 5 is a graph which shows PCE scores plotted versus rotation, demonstrating the sharper correlation peaks to correlation surface ratio achieved with the phase-rho correlation technique as compared to other types of correlation methods.

In FIGS. 3A, 3B, and 3C, the actual peak location of the correlation surface was compared to the correct location; where the peak ideally should have appeared in row and column space. These figures show results for a range of image rotations between zero and 19 degrees. In FIG. 5, the modified PCE metric, PCE' was computed and plotted for each correlation surface for image rotations between zero and 14 degrees using each of the NCC, phase, and phase-rho correlation techniques. In other words, the PCE' scores are plotted versus rotation. The higher PCE' scores achieved using the phase-rho correlation method are apparent in FIG. 5. These order of magnitude higher PCE' scores reflect the resulting sharper correlation peaks achieved with the phase-rho correlation technique described herein as compared to either rho or phase correlation.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for determining similarity between a plurality of signals, comprising:
   selecting a reference data set representing selected characteristics of a defined subject matter;
   collecting data to define a target data set, said target data set representing said selected characteristics measured for at least an overlap area of said defined subject matter common to said target data set and said reference data set;
   calculating for each one of a plurality of sub-regions within said overlap area, a set of normalized cross-correlation values using said reference data set and said target data set to evaluate a plurality of possible positions of the target data within the reference data;
   calculating for said plurality of sub-regions within said overlap area a set of phase correlation values using said reference data set and said target data set to evaluate a plurality of possible position of the target data within the reference data;
   calculating an element by element product of the normalized cross-correlation set and the phase correlation set to determine a phase-rho correlation set for each of said plurality of sub-regions within the overlap area;
   determining a correlation surface peak location for each sub-region defined by identifying a highest value in the phase-rho correlation set for each sub-region; and
   using point sets corresponding to the correlation surface peak locations from selected sub-regions in the overlap area to determine a transformation that minimizes the distance between the reference data set point locations and the corresponding point locations in the target data set to align the target data set with the reference data set;
   wherein at least one of said reference data and said target data is selected from the group consisting of image data, rf signal data, and audio data collected by a sensor.

2. The method according to claim 1, further comprising selecting each of said reference data set and said target data set to be one-dimensional sets.

3. The method according to claim 1, further comprising selecting each of said reference data set and said target data set to be two-dimensional data sets.

4. The method according to claim 3, further comprising:
   selecting a two dimensional portion of said target data set to define a template;
   selectively moving said template to each of said plurality of possible positions within each said sub-region;
   calculating said normalized cross-correlation set and said phase correlation set using said two dimensional portion of said target data defined by said template and a two dimensional portion of said reference data defined within said sub-region.

5. The method according to claim 4, wherein said phase-rho correlation set defines a three-dimensional surface where the x, y locations represent the center position of the template with respect to the reference data set, and the z value is the phase-rho correlation value for each of the x, y locations.

6. The method according to claim 5, further comprising:
   using a peak or maximum z value in each said three dimensional surface calculated for each said template to determine a plurality of correspondence points for associating said reference data and said target data;
   using said correspondence points in an optimization routine which minimizes a distance between the corresponding points.

7. The method according to claim 6, wherein said distance between each corresponding point set is minimized simultaneously under predetermined transformations selected from the group consisting of translation, rotation, and scale.

8. The method according to claim 6, further comprising, using a result of said optimization routine to determine a transformation which optimally brings the target data set into alignment with the reference data set.

9. The method according to claim 3, further comprising selecting said target data set and said reference data set to each comprise image data.

10. A computer system for determining similarity between a plurality of signals, comprising:
    a least one data store configured for storing a reference data set representing selected characteristics of a defined subject matter, and for storing data which defines a target data set, said target data set representing said selected characteristics measured for at least an overlap area of said defined subject matter common to said target data set and said reference data set;
    at least one processing device configured to:
    calculate for each one of a plurality of sub-regions within said overlap area, a set of normalized cross-correlation values using said reference data set and said target data set to evaluate a plurality of possible positions of the target data within the reference data;
    calculate for said plurality of sub-regions within said overlap area a set of phase correlation values using said reference data set and said target data set to evaluate a plurality of possible position of the target data within the reference data;
    calculate an element by element product of the normalized cross-correlation set and the phase correlation set to determine a phase-rho correlation set for each of said plurality of sub-regions within the overlap area;
    determine a correlation surface peak location for each sub-region defined by identifying a highest value in the phase-rho correlation set for each sub-region; and
    to use point sets corresponding to the correlation surface peak locations from selected sub-regions in the overlap area to determine a transformation that minimizes the distance between the reference data set point locations and the corresponding point locations in the target data set to align the target data set with the reference data set;
wherein at least one of said reference data and said target data is selected from the group consisting of image data, rf signal data, and audio data collected by a sensor.

11. The computer system according to claim 10, wherein each of said reference data set and said target data set are one-dimensional sets.

12. The computer system according to claim 10, wherein each of said reference data set and said target data set are two-dimensional data sets.

13. The computer system according to claim 12, wherein a two dimensional portion of said target data set defines a template, and said at least one processing device is further configured for:
selectively moving said template to each of said plurality of possible positions within each said sub-region; and
calculating said normalized cross-correlation set and said phase correlation set using said two dimensional portion of said target data defined by said template and a two dimensional portion of said reference data defined within said sub-region.

14. The computer system according to claim 13, wherein said phase-rho correlation set defines a three-dimensional surface where the x, y locations represent the center position of the template with respect to the reference data set, and the z value is the phase-rho correlation value for each of the x, y locations.

15. The computer system according to claim 14, wherein said at least one processing device is further configured for:
using a peak or maximum z value in each of said three dimensional surface calculated for each said template to determine a plurality of correspondence points for associating said reference data and said target data; and
using said correspondence points in an optimization routine which minimizes a distance between the corresponding points.

16. The computer system according to claim 15, wherein said at least one processing device is further configured for simultaneously minimizing a distance between each corresponding point set using predetermined transformations selected from the group consisting of translation, rotation, and scale.

17. The computer system according to claim 15, wherein said at least one processing device is further configured for using a result of said optimization routine to determine a transformation which optimally brings the target data set into alignment with the reference data set.

18. The computer system according to claim 12, wherein said target data set and said reference data set to each comprise image data.

19. A non-transitory machine readable media programmed with a set of instructions for determining similarity between a plurality of signals, comprising:
selecting a reference data set representing selected characteristics of a defined subject matter;
collecting data to define a target data set, said target data set representing said selected characteristics measured for at least an overlap area of said defined subject matter common to said target data set and said reference data set;
calculating for each one of a plurality of sub-regions within said overlap area, a set of normalized cross-correlation values using said reference data set and said target data set to evaluate a plurality of possible positions of the target data within the reference data;
calculating for said plurality of sub-regions within said overlap area a set of phase correlation values using said reference data set and said target data set to evaluate a plurality of possible position of the target data within the reference data;
calculating an element by element product of the normalized cross-correlation set and the phase correlation set to determine a phase-rho correlation set for each of said plurality of sub-regions within the overlap area;
determining a correlation surface peak location for each sub-region defined by identifying a highest value in the phase-rho correlation set for each sub-region; and
using point sets corresponding to the correlation surface peak locations from selected sub-regions in the overlap area to determine a transformation that minimizes the distance between the reference data set point locations and the corresponding point locations in the target data set to align the target data set with the reference data set;
wherein at least one of said reference data and said target data is selected from the group consisting of image data, rf signal data, and audio data collected by a sensor.

20. A method for determining similarity between a plurality of signals, comprising:
selecting a two-dimensional reference data set representing image data associated with a defined subject matter;
collecting data to define a target data set, said target data set representing two dimensional image data for at least an overlap area of said defined subject matter common to said target data set and said reference data set;
calculating for each one of a plurality of sub-regions within said overlap area, a set of normalized cross-correlation values using said reference data set and said target data set to evaluate a plurality of possible positions of the target data within the reference data;
calculating for said plurality of sub-regions within said overlap area a set of phase correlation values using said reference data set and said target data set to evaluate a plurality of possible position of the target data within the reference data;
calculating an element by element product of the normalized cross-correlation set and the phase correlation set to determine a phase-rho correlation set for each of said plurality of sub-regions within the overlap area;
determining a correlation surface peak location for each sub-region defined by identifying a highest value in the phase-rho correlation set for each sub-region; and
using point sets corresponding to the correlation surface peak locations from selected sub-regions in the overlap area to determine a transformation that minimizes the distance between the reference data set point locations and the corresponding point locations in the target data set to align the target data set with the reference data set.

21. The method according to claim 20, further comprising:
selecting a two dimensional portion of said target data set to define a template;
selectively moving said template to each of said plurality of possible positions within each said sub-region;
calculating said normalized cross-correlation set and said phase correlation set using said two dimensional portion of said target data defined by said template and a two dimensional portion of said reference data defined within said sub-region.

* * * * *